United States Patent [19]

Fritzlen et al.

[11] 4,231,039
[45] Oct. 28, 1980

[54] RADAR SPEEDOMETER

[75] Inventors: Jack D. Fritzlen, Vail; James L. Witler, Avon, both of Colo.

[73] Assignee: Glymar, Vail, Colo.

[21] Appl. No.: 973,942

[22] Filed: Dec. 28, 1978

[51] Int. Cl.² .............................................. G01S 9/44
[52] U.S. Cl. ..................................... 343/8; 343/5 TM; 343/7 PL
[58] Field of Search ................................ 343/7 VM, 8

[56] References Cited

U.S. PATENT DOCUMENTS

| 3,721,977 | 3/1973 | Darboven | 343/8 X |
| 3,893,076 | 7/1975 | Clifford | 343/8 |
| 4,012,736 | 3/1977 | Angwin | 343/8 |

FOREIGN PATENT DOCUMENTS

| 2601495 | 7/1977 | Fed. Rep. of Germany | 343/8 |
| 1468159 | 3/1977 | United Kingdom | 343/8 |

Primary Examiner—T. H. Tubbesing
Attorney, Agent, or Firm—Sheridan, Ross, Fields & McIntosh

[57] ABSTRACT

Method and apparatus for measuring the speed of a land vehicle over a surface. A narrow beam of RF energy is directed toward the surface at a substantial angle. Reflected RF energy is mixed with that transmitted to produce Doppler signals having a spectrum. The spectra of the Doppler signals are normalized by the Doppler signals being applied to an AGC circuit so that the maximum amplitudes of the spectra are substantially constant and being applied to one or more tracking band pass filters which eliminate unwanted frequency components in the spectra. From the normalized spectra, output signals are produced from which can be determined the speed of the vehicle relative to the surface.

21 Claims, 9 Drawing Figures

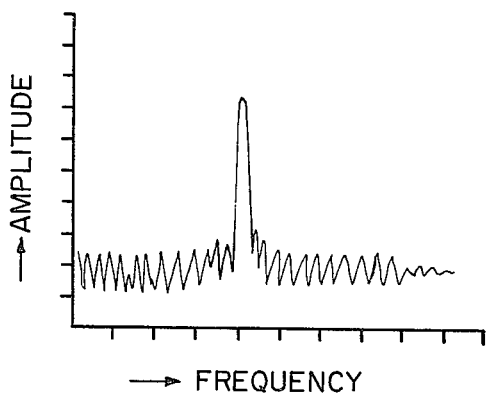
Fig_3
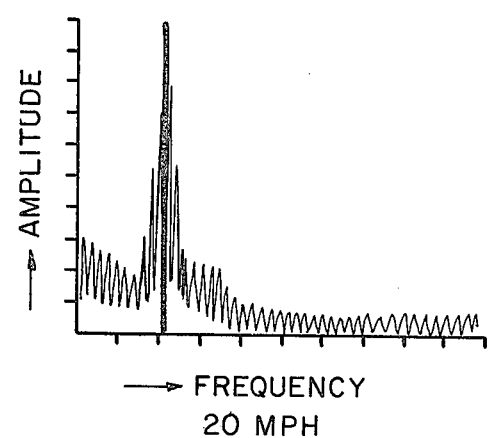
Fig_4B
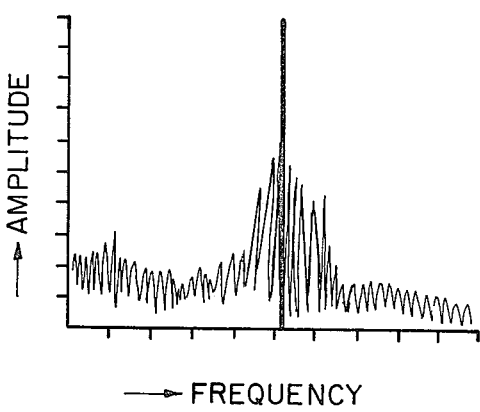
Fig_4A
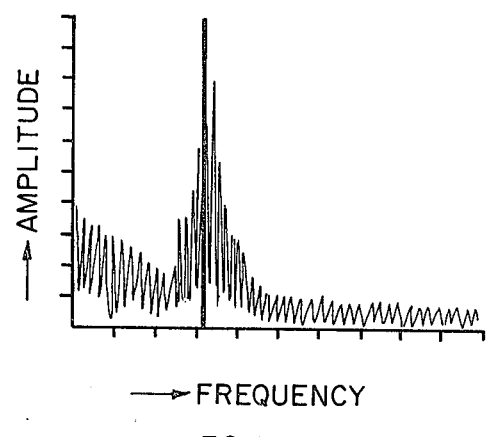
Fig_4C

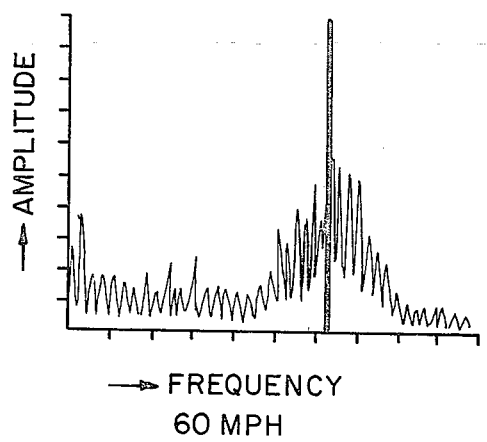
Fig_4D
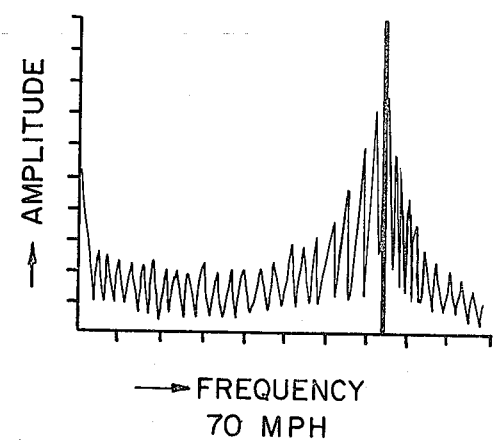
Fig_4F
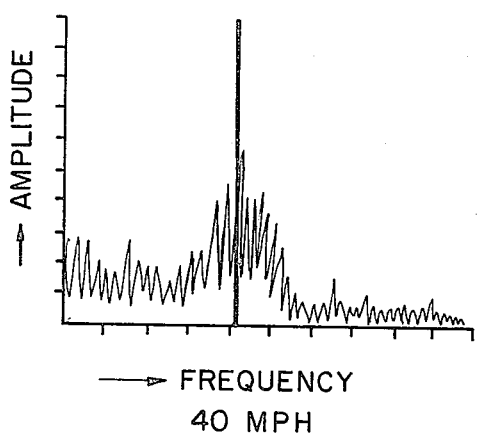
Fig_4E
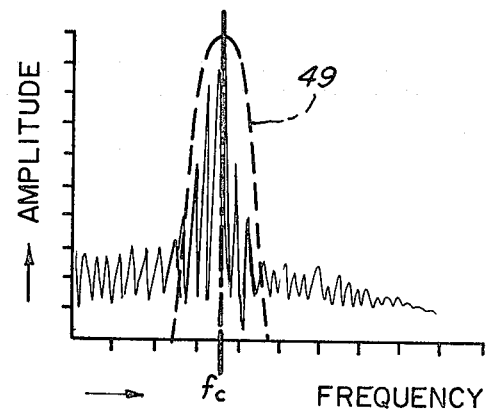
Fig_5

RADAR SPEEDOMETER

TECHNICAL FIELD

This invention is in the field of method and apparatus for measuring the speed of vehicles moving over a fixed surface using Doppler radar and more particularly to such methods and apparatus for measuring the speed of a locomotive relative to the roadbed of the rails on which the locomotive runs.

BACKGROUND ART

To date locomotives have been equipped with mechanical or electromechanical speedometers which essentially detect wheel revolutions per unit time and display this information in terms of miles per hour (mph), for example. Such speedometers have serious problems due to the inaccuracy resulting from the wear of the wheels over a period of time, because of wheel slip particularly at low speeds which increases wear, and finally because of the inherent inaccuracy of such speedometers at low speeds particularly below one mph.

The need for accurate speed measurements, particularly at low speeds has increased as the result of introducing unit trains. The reason being that such trains are frequently loaded with coal, for example, by pulling empty cars at low speeds substantially in the vicinity of one mile per hour under a loading hopper. Any significant variation in speed from the desired speed can result in the cars being under or overloaded.

The application of Doppler radar techniques to measure the speed of automobiles, for example, is well known but such applications generally rely on movement of the vehicle whose speed is to be measured along the antenna beam axis, or boresight. Applying such Doppler radar techniques to measuring the speed of a locomotive is not practical since oncoming or passing trains on adjacent tracks would be within the beam of the transmitted microwave energy and would produce erroneous readings. To prevent moving objects from entering the beam of the radar antenna mounted on such locomotive, the antenna is mounted on the underframe of the locomotive pointed downwardly at the roadbed at a substantial angle and preferably pointing backwards with respect to the front of the locomotive.

With the axis of the transmitted beam of RF energy substantially coinciding with the direction of motion of the target or vehicle, essentially a single Doppler frequency is generated, or at least the amplitude of the single frequency so predominates that it is easily processed as a single frequency which is linearly proportional to the speed of the target. However, if the antenna which transmits and receives the RF energy is mounted at a significant angle with respect to the reflecting surface, the Doppler signals produced do not have a single frequency that substantially predominates but rather produces a spectrum, or distribution, of signals of many frequencies and amplitudes. The reason is that the transmitted beam of electromagnetic energy has a finite beam width so that the beam intersects a substantial area of the roadbed. The spectrum of the Doppler signals so produced differs from the ideal distribution of such signals in part because the reflective characteristics of the roadbed within this area also vary substantially so that the amplitude of the signals vary with time. The spectrum also differs from the ideal because of the unusual geometry of the reflective surface due to grade crossings, guard rails, and to changes in the distance between the roadbed and the antenna mounted on the locomotive, for example.

Attempts to use Doppler radar techniques to measure the speed of locomotives have not heretofore been successful to the degree of precision desired over the desired ranges of speeds because the prior art methods of processing the Doppler signals produced by various types of roadbeds under all types of weather and track conditions have heretofore sought to identify and process the single Doppler frequency, the boresight frequency, which would correspond to that produced by reflecting the transmitted RF energy from that point of the roadbed where the axis of the antenna, its boresight, intersects the roadbed.

PRIOR ART STATEMENT

The following references are submitted under the provisions of 37 CFR 1.97(b):

| U.S. Pat. No.: | |
|---|---|
| 3,833,906 | Augustine |
| 3,895,384 | Fathauer et al |
| 4,012,736 | Angwin |
| 4,052,722 | Millard |
| Re 29,401 | Aker et al |

Publications:

H. C. Johnson, Speed Sensors for Locomotives, published by RCA Laboratories, Princeton, N.J., and copyrighted in 1976 by the RCA Corporation.

Augustine, U.S. Pat. No. 3,833,906, discloses a Doppler radar system which is adapted to measure the speed of land vehicles, particularly automobiles. Two radar antennas are mounted on the vehicle, one of which is forwardly and downwardly directed. The Doppler signals from each antenna are summed to provide a speed signal which is compensated for changes in the pitch of the vehicle.

Fathauer et al, U.S. Pat. No. 3,895,384, discloses a Doppler radar system which is adapted to be mounted on a tractor to measure the cumulative distance traveled by the tractor as well as the rate or speed of travel of the tractor. In Fathauer et al the problems arising from the presence of multiple Doppler frequencies caused by the beam width of the antenna are recognized. Fathauer et al teaches as a solution amplifying and clipping the Doppler frequencies prior to their being subsequently processed.

Angwin, U.S. Pat. No. 4,012,736, discloses a radar speedometer for use on trains for example. Angwin teaches using a duty cycle detector to reject spurious noise.

Millard, U.S. Pat. No. 4,052,722, discloses a traffic radar system. The signal processing subsystem of Millard includes a phase locked loop circuit to which input signals are applied directly. In addition the input signals are also applied to the phase locked loop circuit through a tuneable band pass filter.

Aker et al, U.S. Pat. No. Re 29,401, discloses a Doppler radar system for measuring the speeds of motor vehciles. Aker et al's signal processing circuits include an AGC circuit for attenuating overly strong signals and a tracking band pass filter which is tuneable in steps.

The article by H. C. Johnson discloses a radar speedometer for locomotives. His system includes a tracking low pass filter, the output of which is applied to a phase locked loop, which loop produces a spectrally clean output signal which in turn is used to produce signals to drive the standard locomotive speedometers and recorders. The article by Johnson has a good description of the environment in which locomotive radar speedometers operate.

DISCLOSURE OF INVENTION

The present invention provides both method and apparatus for measuring the speed of a land vehicle moving over a fixed surface. A narrow beamwidth directional microwave antenna is mounted on the vehicle and is directed toward the surface at a substantial angle to the velocity vector of the vehicle. Reflected RF energy from the surface received by the antenna is mixed with the transmitted energy to produce Doppler signals of varying frequencies and amplitudes. The distribution of the amplitudes of the reflected signals is a function of frequency and has a pattern of distribution; i.e., a spectrum. The Doppler signals are amplified by a high gain linear amplifier, and the amplified Doppler signals are applied to an AGC circuit and to a tracking band pass filter. The AGC and tracking band pass filters substantially normalize the spectra of the Doppler signals by causing the maximum amplitudes of the signals of the spectra to have a substantially constant voltage or magnitude and by eliminating the components of the spectra whose frequencies lie outside the pass band of the tracking filter. The signals constituting the normalized spectra are applied to a phase locked loop which produces an output signal. The frequency of this output signal has a substantially constant mathematical relationship with both the center frequency of the passband of the filter and the frequency of those signals reflected from the surface substantially intersected by the axis of the antenna which is defined as the boresight frequency. The boresight frequency in turn has a substantially constant mathematical relationship to the speed of the vehicle over the surface.

It is therefore an object of this invention to provide improved Doppler radar methods and apparatus for measuring the speed of a land vehcile with respect to the surface over which the vehicle is moving.

It is another object of this invention to provide improved Doppler radar methods and apparatus for measuring the speed of a locomotive with respect to the roadbed which accurately and reliably measures the speed of a locomotive over its normal range of speed and which is particularly accurate at very low speeds.

It is another object of this invention to provide an improved method and apparatus for processing a spectral distribution of Doppler signals of varying amplitudes and frequencies to produce a signal whose frequency has a mathematical relationship with the boresight frequency of the spectrum.

BRIEF DESCRIPTION OF DRAWINGS

Other objects, features and advantages of the invention will be readily apparent from the following description of certain preferred embodiments thereof taken in conjunction with the accompanying drawings, although variation and modifications may be effected without departing from the spirit and scope of the novel concepts of the disclosure and in which:

FIG. 3 is a plot of amplitude versus frequency of typical Doppler signals when the motion of the target is along the axis of the transmitted beam;

FIGS. 4 A-F are plots of Doppler signals as recorded at various speeds of a locomotive before normalization using the apparatus and methods of the present invention; and FIG. 5 is a plot of the amplitudes of the Doppler signals of a given spectrum with a plot of the band pass characteristics of a tracking filter showing the relation between them.

BEST MODE FOR CARRYING OUT THE INVENTION

Figure 1:
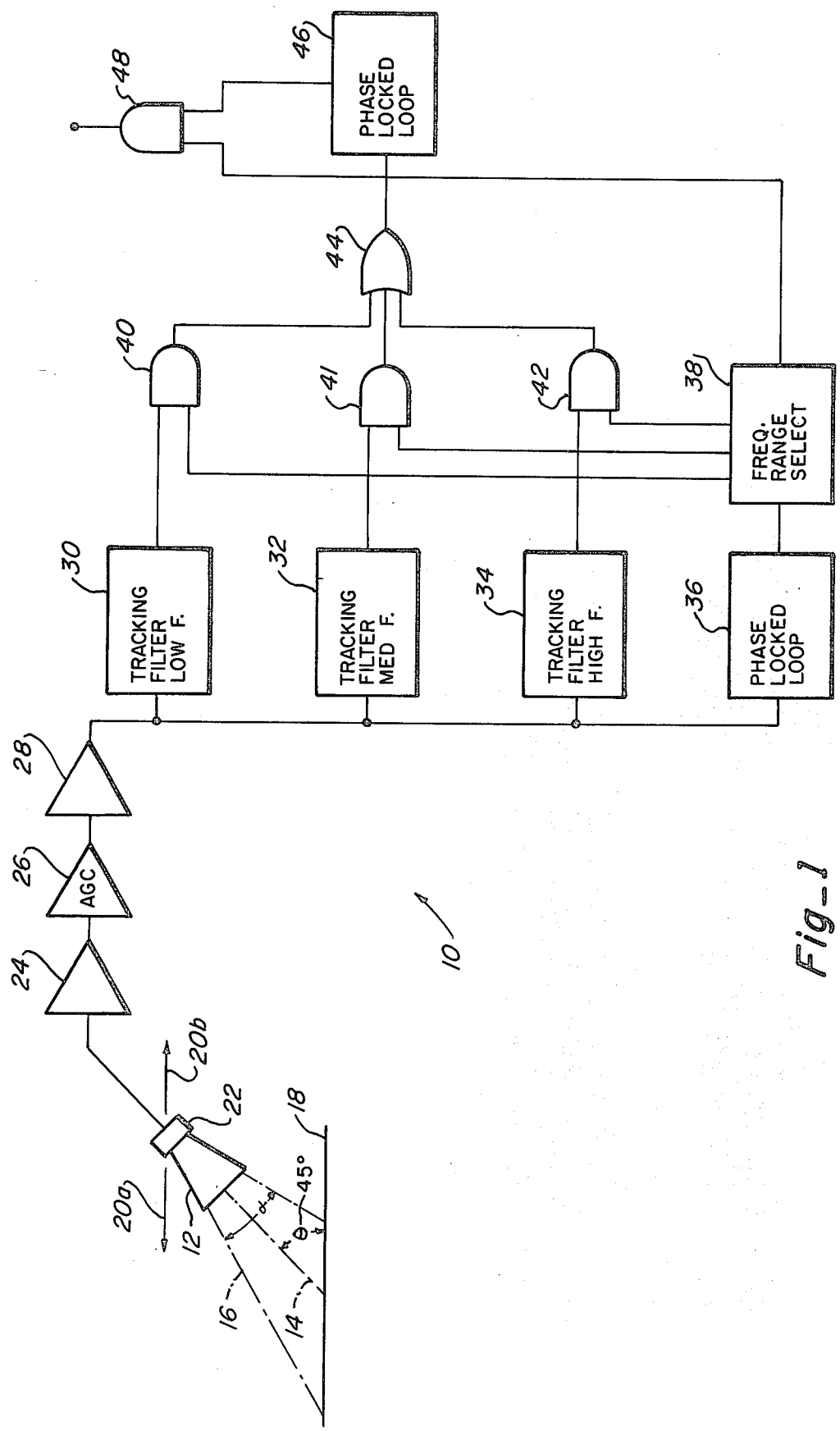
FIG. 1 is a block diagram of the radar speedometer of the invention.

In FIG. 1, radar speedometer 10 is illustrated schematically. Speedometer 10 is adapted to be mounted on a locomotive which is not illustrated with its directional horn antenna 12 mounted on the underframe so that the axis 14 of the cone, or beam, 16 of transmitted microwave electromagnetic energy will strike the surface of roadbed 18 between the rails of a typical railroad track which are not illustrated on which the wheels of the locomotive run. The angle $\theta$ of the beam with respect to surface 18 is, in the preferred embodiment, substantially 45°. The direction of motion of the locomotive with respect to roadbed 18 is shown by the arrows 20a, 20b, and preferably antenna 12 is mounted so that it points in a direction opposite to the direction in which the locomotive is moving. While such an orientation of antenna 12 is desirable, it is not necessary. Connected to antenna 12 is a conventional electromagnetic wave generator and receiver, transceiver 22. Transceiver 22 preferably comprises a Gunn diode oscillator utilized in the self detecting mode in which the Gunn diode transmits RF energy, detects the reflected RF energy, and mixes them. In the preferred embodiment the Gunn diode generates a microwave (CW) signal tuned to 10,525 MHz. Some of the transmitted signals forming beam 16 will be reflected from roadbed 18 and received within antenna 12. The reflected signals are mixed in the Gunn diode with the transmitted signals to produce Doppler signals having frequencies equal to the difference in frequencies between the transmitted signals and the received signals. The frequencies of the received signals vary with the speed of the locomotive and thus of antenna 12 over the roadbed, as is well known.

For a ground speed radar sensor having an antenna 12 that produces a narrow beam 16 of transmitted microwave energy whose axis 14 lies in a vertical plane through the locomotive velocity vector 20 and strikes the roadbed 18 at an incident angle $\theta$, the Doppler shift $F_d = 2V_g/\cos\theta\lambda$ where $V_g$ is the speed of the locomotive and $\lambda$ is the wavelength of the transmitted signal. For the ideal case with a transmitted frequency of 10,525 MHz and if $\theta = 45°$, then $f_d$ is approximately 21 Hz for each mph of locomotive speed. This is true only if the beam 14 has no substantial beam width. The finite width of beam 16, where $\alpha = 10°$, causes the Doppler frequency to be spread over a range of frequencies that is a function of the width $\alpha$ of beam 16 so that the Doppler frequencies produced by transceiver 22 have a distribution of frequencies, or a spectrum.

The Doppler signals from transceiver 22 are applied to a conventional linear preamplifier 24. The purpose of preamplifier 24 is to amplify the Doppler signals produced by transceiver 22 to a convenient level for subsequent processing. As a step in the process of normalizing the spectrum of the Doppler signals, the signals produced by preamplifier 24 are applied to automatic gain control (AGC) circuit 26. The dynamic range of AGC 26 should be large, 60 dB in the preferred example so that it can adjust a weak reflected signal nearly equal to the base line noise produced by the transceiver 22 and preamplifier 24 to the strongest anticipated signal. A suitable AGC circuit for this application is described in an article entitled "Automatic Gain Control has 60 Decibel Range", by N. Hecht, *Electronics,* Mar. 31, 1977, page 107. AGC circuit 26 detects the highest amplitudes of the received signals of the Doppler spectrum and delivers output signals in which the signals forming the top portions of the spectrum will have a substantially constant voltage or amplitude regardless of the actual amplitudes of the reflected signals which vary with the nonuniform reflective characteristics of roadbed 18. The amplitudes of the balance of the signals of the spectrum will be amplified proportionately.

The output signals of AGC 26, the spectra of which are normalized as to amplitude, are in the preferred embodiment further amplified by conventional linear amplifier 28 and the output of amplifier 28 is applied to tracking filters 30, 32, 34 and independent phase locked loop 36.

Figure 2:
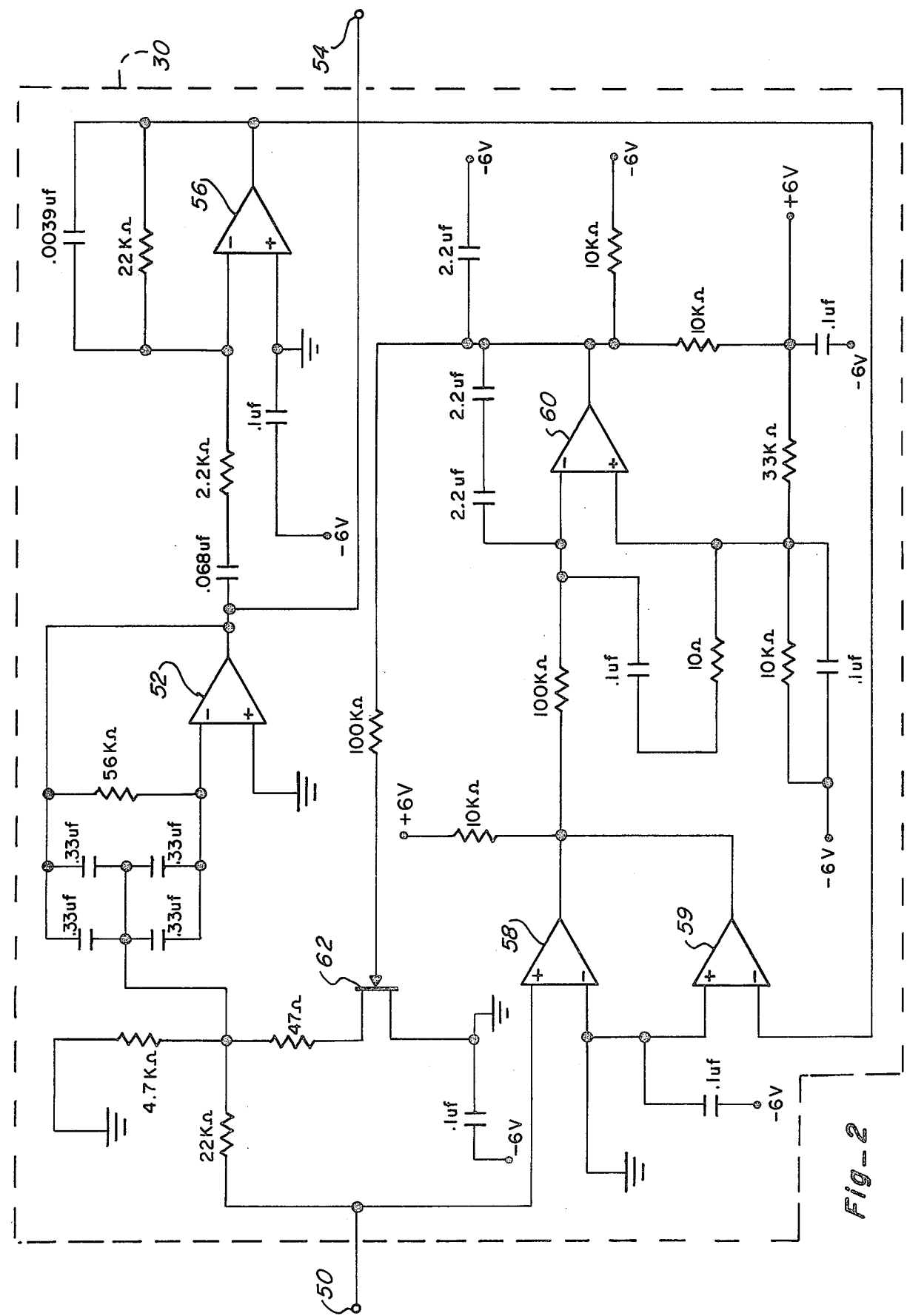
FIG. 2 is a schematic circuit diagram of a tracking band pass filter.

FIG. 2 is a schematic of tracking filter 30. Tracking filters (TF's) 32, 34 are similar to TF 30 except that the values of selected passive elements, capacitors and resistors, are chosen to provide different operating characteristics; i.e., frequency ranges over which the tracking filters are designed to operate. Tracking filters 30, 32, 34 detect the predominant, in amplitude, signals applied to them and lock on and track such predominant signals over a frequency range of 10 to 1, for example. If it is desired to measure speeds of the locomotive in the range of from 0.7 mph to 125 mph, the low frequency TF 30 would be designed to track frequencies corresponding to speeds in the range of 0.7 to 4 mph (14.7 to 84 Hz); medium frequency range TF 32 would be designed to track frequencies corresponding to speeds in the range of from 2.5 mph to 21 mph and high frequency TF 34 would be designed to track frequencies corresponding to speeds in the range of from 17 to 125 mph, for example. Increasing the operating frequency range of a TF decreases the number of TF's needed for a given application. As will be explained later the Q's of the TF's 30, 32, 34 are chosen so that they substantially match the normalized spectrum of the Doppler signals applied to them.

The spectra of the signals produced by amplifier 28 after being normalized as to amplitude by AGC 26 are also applied to a conventional independent phase locked loop (PLL) 36. PLL 36 substantially follows the signals of maximum amplitude which approximates the Doppler frequency produced from the RF reflected from that portion of the roadbed 18 intersected by the beam axis 14 or the boresight of antenna 12 which frequency hereafter is sometimes referred to as the boresight Doppler frequency. The output signal of independent phase locked loop 36, a DC voltage roughly proportional to the boresight Doppler frequency, is applied to a frequency range selector logic circuit 38. The output signals of the TF's 30, 32, and 34 are selectively applied to one of the two input terminals of conventional AND gates 40, 41, 42. The other input terminals are connected to logic circuit 38 which operates to enable only one of AND gates 40, 41, 42 if the speed of the locomotive is in the desired operating range, i.e., equal to or greater than 0.7 mph and not substantially greater than a maximum speed of 125 mph in a preferred example. The output signals of gates 40, 41, 42 are applied to the input terminals of a conventional three input inclusive OR gate 44. The output of OR gate 44 is applied to master phase locked loop 46. MPLL 46 will produce a single frequency output signal the frequency of which is the weighted mean of the frequencies of the signals constituting a normalized spectrum, and will substantially equal the center frequency $f_c$ of the pass band of whichever TF is operationally connected to one input terminal of a two input terminal AND gate 48. Gate 48 will be enabled whenever the Doppler frequency signals applied to PLL 36 equal or exceed the minimum speed that can be measured accurately by speedometer 10, 0.7 mph in the preferred embodiment. In a preferred embodiment phase locked loop circuits 36, 46 each include a monolithic integrated circuit model CD 4046AF which is a product of the RCA Corporation.

In operation antenna 12 will be mounted so that is is substantially 18 inches above the conventional ballast of track bed 18 and is pointing rearwardly with respect to the front of the locomotive and at an angle such that the angle of incidence of the microwave radiation beam 16 transmitted from antenna 12, is in the preferred embodiment substantially 45°. It is well to note here that the transceiver 22 will generate the same spectra when the direction of the locomotive travel is coincident with the velocity vector 20 or exactly opposite. As mentioned above the frequency of the CW signals radiated or transmitted from antenna 12 is substantially 10,525 MHz.

Applications of the Doppler radar to measure the speed of a vehicle moving in either direction along the axis of the beam of radiation produces essentially a single Doppler frequency, or at least the amplitude of such a frequency so predominates, i.e., has the greatest amplitude so that the boresight Doppler frequency is easily identified and processed. FIG. 3 is a plot of amplitude versus frequency of such a system as might be produced by the Speed Measuring Apparatus of U.S. Pat. No. 3,118,139 which issued on Jan. 14, 1964, for example.

However, if the antenna which transmits and receives the electromagnetic waves is mounted at a significant angle, as is antenna 12 of speedometer 10, a complex spectrum of Doppler frequencies is produced. FIGS. 4A-F are plots of the Doppler signals as produced at the output of transceiver 22 at the speeds indicated. In FIGS. 4A-F the solid vertical lines were generated by the test equipment and represent the calculated boresight Doppler frequency for the speed of the locomotive.

A perusal of FIGS. 4A-F demonstrates that the return signals at any angle of incidence in the range of $\theta \pm \frac{1}{2}\alpha$ including the boresight angle $\theta$ will not predominate in amplitude. The information illustrated in FIGS. 4 amply confirm this. Therefore with the beam significantly angled as in the present invention, the frequency spectrum generated must be considered as an entity and normalized before it can be processed to determine the actual speed. Other then the boresight frequency the balance of the spectrum will have frequencies which are the result of the transmitted signals being reflected from targets not lying on the boresight so that the cosine corrections for such signals differ. Thus angling the antenna with respect to the reflecting surface causes a spectrum of signals to be produced rather than a single frequency. Because of the variations in frequency and amplitude of the reflected or Doppler signals, to accurately determine the speed of a locomotive, for example, it is necessary to normalize the spectrum of the Doppler signals if the output of the speedometer is to be an accurate and reliable representation of vehicle speed. The plots of FIGS. 4 display the obvious characteristics of amplitude and frequency variations associated with the spectra of Doppler signals produced by the transceiver 22. By selecting a reasonable directive horn antenna 12 one can assure that the microwave energy directed toward and reflected from reflective objects near the boresight 14 will statistically develop Doppler signals of higher amplitude than those produced by targets further away. However, the spectra of the Doppler signals are distorted from the ideal by the relatively greater amplitudes of the low frequency components or signals which are developed by reflections at angles closer to the vertical than the boresight angle $\theta$, by the varying reflectivity of the road bed, random noise, varying geometry of reflecting objects, etc. In FIG. 4D the base line noise at the low frequencies approximates in amplitude the base line noise of the higher frequencies seen to the right of the boresight frequency. In FIG. 4C the amplitudes of the lower frequency signals greatly exceed the base line noise and are about one-half the maximum amplitude of the spectrum. These variations are caused in part by changes in the reflective characteristics of the roadbed. Therefore, to facilitate accurately determining the speed of the vehicle from the spectrum of Doppler signals produced by transceiver 22 it is necessary to eliminate as many of the causes of such distortions as is possible to produce a normalized spectrum, or an idealized distribution of the Doppler signals.

In this application the word "normalized" is used. Its meaning is its mathematical meaning, or more precisely, its statistical meaning which is "to reduce to a standard". Typically raw data from various samples will be processed to eliminate the distortions or abnormalities caused by the nature of the samples or the sample taking methods so that the underlying values of the samples are expressed free of those distortions or abnormalities. The distortions or abnormalities present in the spectrum of Doppler signals produced by transceiver 22 fall into three general categories, amplitude, low frequency components, and spurious random noise. Amplitude distortions caused by variations in the reflective characteristics of the road bed are substantially eliminated, or minimized, by AGC 26. The spectrum of signals produced by AGC 26 can be considered as normalized in amplitude. The distortions caused by the low frequency components of the spectrum of Doppler signals are substantially eliminated, or minimized, by tracking filters 30, 32, 34 since the low frequency components will not be in the pass band of the filter. For the same reason, most of the components of the signals classified as random noise outside the band pass of TF's 30, 32, 34 will also be rejected. The spectrum of the signals produced by TF's 30, 32, 34 can be considered as normalized in frequency. Thus normalizing as used in describing this invention is the processing of a spectrum of signals as received to substantially eliminate, or minimize, the abnormalities of the received spectra to produce a normalized spectra which substantially approximates the ideal.

In FIG. 5 the spectrum corresponding to FIG. 4B is plotted together with the band pass characteristics 49 of the tracking filter at 20 mph. By matching the Q of the pass band of the tracking filter so that is substantially matches the normalized spectra, or idealized distribution of the Doppler signals, it can be seen that the two are substantially matched and that the center frequency $f_c$ of the filter will substantially equal the boresight frequency as calculated. In this application Q is substantially equal to the width of the band pass of the filter between its 3dB points divided by its center frequency.

Referring to FIG. 2, which is a schematic of the low frequency tracking band pass filter 30, the normalized in amplitude spectrum of Doppler signals is applied to input terminal 50 and is then applied to the filter portion of tracking filter 30 which includes op amp 52. The output signals of op amp 52 are applied to output terminal 54 of TF 30 and are capacitively coupled to a feedback network which includes op amp 56, a pair of comparators 58, 59, where the normalized input signals applied to input terminal 50 are combined with the feedback signal coming from a phase shifter circuit which includes op amp 56. The combined signals are then applied to comparator 60. The output of comparator 60 is applied to the gate of the FET 62 which modifies the center frequency $f_c$ of tracking filter 52 so that $f_c$ of TF will substantially correspond to the statistical center, the boresight, frequencies of the spectrums of signals which are applied at terminal 50.

In FIG. 2 in a preferred embodiment the comparators 58, 59 and 60 are each one-fourth of an MLM 139AL and the op amps 52, 56 are each one-half of an MLM 1558AL both of which are commercially available from Motorola Inc. As inferred above, the normalized spectrum of the Doppler signals has the characteristics of Q, since it can be described in the same terms of frequency and band width as is used to define the Q of a pass band filter. For example, in FIG. 5 the band width of the tracking filter is 50 Hz at a center frequency of 200 Hz which produces a Q of 4. The Q of the received spectrum, which depends primarily on the beam width of the directional antenna and the geometry of the antenna installation, can also be considered to have substantially a similar Q. To operate properly, the circuit values of the selftuning band pass filters 30, 32, 34 are selected to have Q's approximating or matching the Q's of the normalized spectrums of Doppler signals applied to them. In the preferred embodiment the proper Q's are in the range of from 4 to 10. In FIG. 5 only those signals constituting the normalized spectrum, or the idealized distribution of the Doppler signals, represented by the dashed line will appear at the filter output terminal. The signals of the received spectrum whose frequencies are not within the pass band of the filter will be rejected or not passed. The rejected signals are noise and low frequency components primarily. The normalized spectrum is reduced to a single frequency signal by the master phase locked loop 46 to which the input of the tracking filters are applied.

From the foregoing it should be evident that various modifications can be made to the described embodiments without departing from the scope of the present invention.

We claim:
1. Apparatus for measuring the speed of a vehicle moving over a fixed surface comprising:
    first means adapted to be mounted on the vehicle for transmitting a narrow beam of microwave energy toward the surface at a predetermined angle with respect to the direction of travel of the vehicle, for receiving microwave energy reflected from the surface, and for producing an output Doppler frequency spectrum which is a function of the speed of the vehicle;

signal processing means responsive to all signals in the Doppler frequency spectrum and outputting a normalized Doppler spectrum having a number of signals of different amplitudes and frequencies; and second means to which the normalized Doppler spectrum is applied for producing an output signal which is the weighted mean of the normalized Doppler spectrum and which is substantially a predetermined function of the speed of the vehicle with respect to the surface.

2. The apparatus of claim 1 in which the signal processing means includes an AGC circuit.

3. The apparatus of claim 1 in which the signal processing means includes a tracking filter.

4. The apparatus of claim 1 in which the signal processing means includes an AGC circuit and a tracking filter.

5. The apparatus of claim 4 in which the tracking filter is a tracking band pass filter.

6. Apparatus for measuring the speed of a vehicle moving relative to a surface comprising:

first means adapted to be mounted on the vehicle for transmitting a narrow beam of microwave energy toward the surface at a predetermined angle with respect to the direction of travel of the vehicle, for receiving microwave energy reflected from the surface, and for producing a spectrum of unprocessed Doppler signals the amplitude and frequency distributions of which signals substantially deviate from the ideal and which are a function of the speed of the vehicle;

second circuit means to which the spectrum of unprocessed Doppler signals produced by the first means are applied for producing a spectrum of processed Doppler signals whose amplitudes and frequency distributions substantially approximate the ideal;

third means to which the spectrum of processed Doppler signals produced by the second circuit means are applied for producing an output signal the frequency of which is the weighted mean of the frequencies of the processed Doppler signals and which is substantially a predetermined function of the speed of the vehicle relative to the surface.

7. The apparatus of claim 6 in which the second circuit means includes an AGC circuit.

8. The apparatus of claim 6 in which the second circuit means includes a tracking filter.

9. The apparatus of claim 6 in which the second circuit means includes an AGC circuit and a tracking filter.

10. The apparatus of claim 6 in which the second circuit means includes an AGC circuit and a plurality of tracking band pass filters.

11. The apparatus of claim 10 in which the number of tracking band pass filters is three.

12. The method of measuring the speed of a vehicle moving over a fixed surface comprising the steps of:

producing an output Doppler frequency spectrum which is a function of the speed of the vehicle from a narrow beam of microwave energy transmitted toward the surface at a predetermined angle with respect to the direction of travel of the vehicle and reflected from the surface;

processing all signals in the Doppler frequency spectrum produced by said first means to produce a normalized Doppler spectrum having a number of signals of different amplitudes and frequencies; and producing an output signal from the normalized Doppler spectrum which output signal is the weighted mean of the normalized Doppler spectrum and which output signal is a predetermined function of the speed of the vehicle with respect to the surface.

13. The method of claim 12 in which the step of normalizing the Doppler frequency spectrum includes normalizing the spectrum in amplitude.

14. The method of claim 12 in which the step of normalizing the Doppler frequency spectrum includes normalizing the spectrum in frequency.

15. The method of claim 12 in which the step of normalizing the Doppler frequency spectrum includes normalizing the spectrum in amplitude and in frequency.

16. Apparatus for measuring the speed of a vehicle moving over a fixed suface comprising:

directional antenna means adapted to be mounted on the vehicle for directing a beam, having an axis of transmitted signals of RF energy, toward the surface over which the vehicle is moving and for receiving reflected signals of the transmitted RF energy from the surface;

first circuit means connected to the antenna means for producing the RF energy transmitted by the antenna and for producing Doppler signals, the frequencies of which are the difference between the transmitted signals and the reflected signals, said Doppler signals having a received spectrum which deviates from an idealized spectrum of said Doppler signals;

an AGC circuit to which the Doppler signals from the first circuit means are applied for producing as its output, spectra of said Doppler signals having substantially constant maximum amplitudes;

tracking band pass filter means to which the output of the AGC circuit is applied which passes signals substantially within the bank pass of the tracking filter means, said tracking band filter having a Q which substnatially matches the Q of the idealized spectrum of the Doppler signals and said tracking band pass filter having a center frequency; and second circuit means connected to the tracking band pass filter means to which is applied signals of the spectrum of the tracking band pass filter within the band pass of the filter for producing an output signal the frequency of which is the weighted mean of the frequencies of the Doppler signals and which output signal substantially corresponds to the center frequency of the pass band of the tracking filter means at any given time and which frequency is a function of the speed over said fixed surface.

17. Apparatus as defined in claim 16 in which the Q of the tracking band pass filter means is in the range of from 4 to 10.

18. The method of measuring the speed of a vehicle moving over a fixed surface comprising the steps of:

directing a narrow beam of RF energy from a source mounted on the vehicle toward the surface and producing Doppler signals from the beam reflected back toward the vehicle within said beam, said Doppler signals having a spectrum;

normalizing the amplitude of the spectrum of the Doppler signals;

normalizing the frequency distribution of the spectrum of Doppler signals by filtering from the spectrum of the Doppler signals normalized in amplitude substantially all signals of the spectrum the frequencies of which do not lie within the pass band of a tracking band pass filter, said pass band having a Q which substantially matches the spectrum of the Doppler signals normalized in amplitude and frequency; and producing from the signals of the Doppler spectrum, normalized in amplitude and frequency, an output signal which is the weighted mean of the frequencies of the Doppler signals and which is a predetermined function of the speed of the vehicle relative to said fixed surface.

19. Apparatus for measuring the speed of a locomotive moving over a roadbed comprising:

a directional antenna mounted on the underframe of the locomotive for directing a narrow beam of transmitted microwave energy toward the ground, said beam having a boresight which intersects the surface of the roadbed substantially at an angle $\theta$ and has a beam width of 60 ;

a transceiver connected to the directional antenna for producing the microwave energy which is transmitted by the antenna and for producing Doppler signals by mixing transmitted signals with received signals reflected from the roadbed within the beam of the antenna, said Doppler signals having a frequency distribution which is a function of the speed of the vehicle and the position of the portions of the surface with respect to the bore sight from which the received signals are reflected, and the amplitudes of which are a function of the reflective characteristics of said portions and the Doppler frequency of the signals reflected from the portion of the roadbed intersected by the boresight frequency;

an amplifier circuit connected to the transceiver for amplifying the Doppler signals;

an AGC circuit connected to the amplifier circuit for varying the amplitudes of the Doppler signals amplified by the amplifier circuit so that the maximum amplitudes of the frequency distributions of the Doppler signals at its output are substantially constant;

a plurality of tracking band pass filters;

circuit means for applying the output of the AGC circuit to the tracking band pass filters, each tracking band pass filter having an operating frequency range, the operating frequency ranges of the filters overlapping the range of frequencies corresponding to the range of speeds of the locomotive to be measured;

a phase locked loop; and circuit means for connecting to the phase locked loop signals from the one of said plurality of tracking filters whose operating range includes the boresight frequency for the speeds of the locomotive relative to the roadbed at any given time;

said phase locked loop producing an output signal whose frequency is a predetermined function of the speed of the locomotive with respect to its roadbed.

20. Apparatus for measuring the speed of a locomotive ad defined in claim 19 in which $\theta$ substantially equals 45° and $\alpha = 10°$ .

21. Apparatus for measuring the speed of a locomotive as defined in claim 19 in which the number of tracking band pass filters is three.

* * * * *

UNITED STATES PATENT AND TRADEMARK OFFICE
CERTIFICATE OF CORRECTION

PATENT NO. : 4,231,039

DATED : October 28, 1980

INVENTOR(S) : Jack D. Fritzlen and James L. Witler

It is certified that error appears in the above—identified patent and that said Letters Patent is hereby corrected as shown below:

Column 11, line 23, delete "60" and insert --α--.

Signed and Sealed this

Sixteenth Day of June 1981

[SEAL]

Attest:

RENE D. TEGTMEYER

Attesting Officer     Acting Commissioner of Patents and Trademarks